June 2, 1959    R. S. COFFMAN    2,889,070
SAFETY PRESSURE RELIEF DEVICE SUPPORT
Filed Sept. 29, 1955

ROBERT S. COFFMAN
INVENTOR.

BY
ATTORNEY

2,889,070
SAFETY PRESSURE RELIEF DEVICE SUPPORT

Robert S. Coffman, Kansas City, Mo., assignor to Black, Sivalls & Bryson, Inc., Kansas City, Mo., a corporation of Delaware Application September 29, 1955, Serial No. 537,450

2 Claims. (Cl. 220—89)

The present invention relates to safety pressure relief devices. More particularly, the present invention relates to supports for safety pressure relief devices of the rupturable diaphragm type which are likely to be exposed to pressure differentials opposite to those of which the device is to relieve pressure.

Most rupturable disc type safety pressure relief devices require some support on their pressure side to prevent reversal, crinkling and fatigue when subjected to alternating conditions of pressure and vacuum. These rupturable disc devices are of many and variable designs ranging from flat to dome-shaped units. The usage of such units as a relieving device to protect some pressure equipment from excessive pressures requires that they uncover a large relieving area upon rupturing so that a sufficient amount of fluid may escape to allow a decrease of pressure in the equipment to be protected. This requirement thereby limits the design of supporting members for such rupturable disc devices since it must provide support under the whole of the rupturable disc device exposed to vacuums and also, open to allow as large a relieving area as possible. Obviously, a maximum amount of support by the support member and a minimum amount of blocked area caused by the support member upon rupture of the disc are somewhat inconsistent features.

Previous support devices have been made to provide sufficient support for conditions of pressure differential approaching a complete vacuum or greater positive pressure differential but they are of such strength as to offer such resistance to bending as not to open sufficiently and thereby restrict the relieving area. This condition cannot be tolerated since the relieving area is designed to not only relieve the extreme pressure which may be reached in the equipment protected but also to relieve pressures with such rapidity that no additional pressure build up will result. Thus the alternative is to provide a satisfactory supporting device or to design the relieving areas so that the required area will be obtained even though the support device does not open completely. This latter alternative is obviously very uneconomical and in most cases not feasible.

Therefore, it is the primary object of the present invention to provide a supporting member for a rupturable disc type safety pressure relief device which provides a maximum amount of support area for the rupture disc and also upon rupture of the disc provides a minimum amount of obstruction to the flow path of the fluid escaping through the relief area.

A further object of the present invention is to provide a support member for a rupturable disc type safety pressure relief device which will withstand and properly support the disc at positive pressure differentials tending to reverse the disc which are greater than an absolute vacuum.

Still further objects of the present invention are to provide a support member for a rupturable disc type safety pressure relief device which may be constructed to support any desired design of the rupture disc and to provide a support member which opens immediately upon rupture of the rupture disc.

In accomplishing these and other objects of the present invention, I have provided improved details of structure, the preferred form of which is illustrated in the accompanying drawings wherein.

Figure 1:
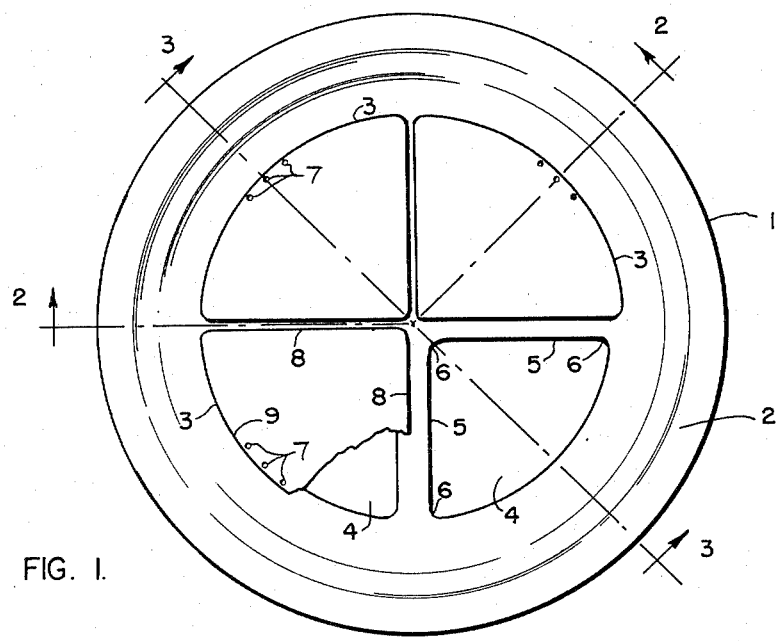
Fig. 1 is a partially cut away plan view of a support member constructed in accordance with the present invention.
Figure 2:
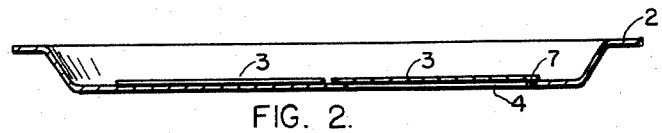
Fig. 2 is a sectional view of the support member shown in Fig. 1 taken along lines 2—2.

Referring more in detail to the drawing:

Support member 1 is shown in Fig. 1 as a support for a flat type rupture disc. Support member 1 is composed of a single base 2 and four segment members 3. Each segment member 3 covers a sector-shaped hole 4 cut into base 2. One segment member 3 is not illustrated in Fig. 1 in order to clearly show the design of the hole 4. Holes 4 are evenly spaced in base 2 and this spacing leaves the central portion of base 2 intact in the form of a cross 5. Corners 6 of holes 4 are made to have a slight radius to prevent any stress concentration. Also, all edges and corners of segment members 3 are rounded since segment members 3 will be in physical contact with the rupture membrane (not shown) which may be made of very thin, easily abraded material.

Segment members 3 are secured to base 2 by means of spot welds 7 on their outer periphery as shown in the drawing. Segment members 3 are larger than holes 4 so that when installed they will be supported completely around their periphery by base 2. It should be noted that the spacing of the spot welds 7 or any other means of securing segment members 3 to base 2 will determine the ease of opening of segment members 3 upon rupture of the rupture disc. If a single spot weld 7 is used then the pressure differential required to open segment members 3 is relatively low compared with the pressure required when two widely spaced spot welds 7 are used. A very important feature in the use of spot welds 7 or other suitable securing means is that segment members 3 should be secured to base 2 so that they will bend and give complete opening under low pressure differentials and they will remain secured to base 2 under all conditions of rupture.

While segment members 3 may be secured to base 2 along a single radial edge 8 there is a distinct advantage to securing said segment members 3 to base 2 along a portion of arcuate edge 9. The reason for the advantage is that the line of bending will be short, taking place along an approximately straight line; thus, bending of each of segment members 3 when secured along a portion of arcuate edge 9 is on a chord of a circle while the bending of each of segment members 3 when secured along a portion of radial edge 8 will tend to be on a straight radial line which extends the whole length of radial edge 8 unless there is some distortion. From the foregoing, it may be seen that the bending on a chord will have a shorter length of bend and therefore will offer less resistance to bending.

Figure 3:
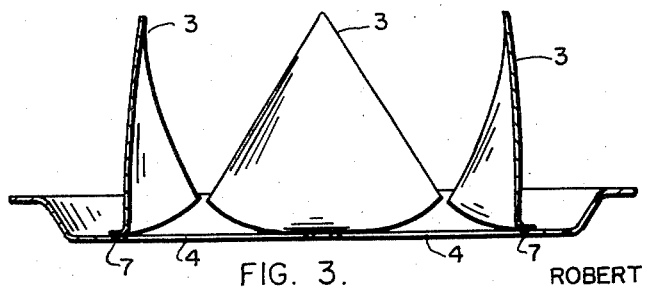
Fig. 3 is a sectional view of the device shown in Fig. 1 taken along lines 3—3 and illustrating the position of the related elements immediately subsequent to the rupture of the rupture disc.

Fig. 3 illustrates the position of segment members 3 under full open relieving conditions. As may be seen segment members 3 will open by bending on a line close to spot welds 7. Other means for securing segment members 3 to base 2 and still provide a minimum resistance to the bending of segment members 3 are welding, soldering, flush riveting and any other similar suitable means. Care should be taken to provide sufficient attachment so that segment members 3 will not separate from base 2 and become a loose object in the relief stream when the rupture disc ruptures.

The support member as hereinbefore disclosed is particularly adaptable for use with safety pressure relief devices such as that shown in my co-pending application Serial No. 448,081, filed August 5, 1954 and the Hansen and Coffman co-pending application Serial No. 565,672, filed February 15, 1956. It should be noted that the present invention discloses a support device for use with such safety pressure relief devices which are installed in systems wherein they need support for conditions of reverse pressure differentials.

Thus, it may be seen that I have provided a support for a rupture disc which will allow a maximum amount of supporting strength and a maximum relief opening. The device of the present invention will also provide an adequate support for a rupture unit even under conditions of positive pressure differentials more extreme than a complete vacuum.

It should be obvious that the support device disclosed may be used with segment members numbering three, four, or more depending upon the size of the relief area and the conditions of free area and pressure differential to which the rupture unit will be exposed.

What I claim and desire to secure by Letters Patent is:

1. A device for supporting rupturable type safety pressure relief devices comprising, a circular base member, said base member having an outer annular flange portion and central integral radial cross pieces forming a plurality of sector-shaped openings therethrough, a plurality of sector-shaped members, each of said sector-shaped members positioned on the side of said base member on which the device being supported is mounted and in edge overlapping covering relationship to one of said openings, and means rigidly securing said sector-shaped members to said outer annular flange portion only of said base member whereby pressure fluctuations can be transmitted through said openings without disturbing said sector-shaped members and whereby said sector-shaped members will bend, uncovering said openings when the safety pressure relief device being supported ruptures.

2. Invention according to claim 1 wherein said securing means comprises at least two spot welds located near the outer edge of each of said sector-shaped members and in close proximity to a line bisecting the central angle of the openings in said base member which is covered by the sector-shaped member being secured.

References Cited in the file of this patent

UNITED STATES PATENTS

| | | |
|---|---|---|
| 146,619 | Titus | Jan. 20, 1874 |
| 530,057 | Salberg | Nov. 27, 1894 |
| 1,287,223 | Cathey | Dec. 10, 1918 |
| 2,111,480 | Pawlitschek | Mar. 15, 1938 |
| 2,291,360 | Unger | July 28, 1942 |
| 2,291,374 | Canfield | July 28, 1942 |
| 2,548,744 | Simms | Apr. 10, 1951 |
| 2,656,950 | Coffman | Oct. 27, 1953 |

FOREIGN PATENTS

| | | |
|---|---|---|
| 488,953 | Great Britain | Jan. 18, 1937 |